United States Patent [19]

Guimarin et al.

[11] Patent Number: 5,612,606
[45] Date of Patent: Mar. 18, 1997

[54] BATTERY EXCHANGE SYSTEM FOR ELECTRIC VEHICLES

[75] Inventors: David C. Guimarin, 2415 Lascar Pl., San Jose, Calif. 95124; Wayne M. Janik, Union City, Calif.

[73] Assignee: David C. Guimarin, San Jose, Calif.

[21] Appl. No.: 307,264

[22] Filed: Sep. 15, 1994

[51] Int. Cl.⁶ .................................................... H01M 10/46
[52] U.S. Cl. .................................. 320/2; 104/34; 414/281
[58] Field of Search ............................ 320/2, 5; 104/34; 414/281, 282, 283, 284, 285, 286

[56] References Cited

U.S. PATENT DOCUMENTS

| | | |
|---|---|---|
| 3,782,750 | 1/1974 | Peters . |
| 3,799,063 | 3/1974 | Reed . |
| 3,834,563 | 9/1974 | Teti . |
| 3,876,086 | 4/1975 | Kappei . |
| 3,983,952 | 10/1976 | McKee . |
| 4,102,273 | 7/1978 | Merkle et al. . |
| 4,216,839 | 8/1980 | Gould et al. . |
| 4,334,819 | 6/1982 | Hammerslag . |
| 4,450,400 | 5/1984 | Gwyn . |
| 4,983,903 | 1/1991 | Bae et al. . |
| 5,091,687 | 2/1992 | Meyer et al. . |
| 5,275,525 | 1/1994 | Grumblatt ............................ 104/34 X |
| 5,305,513 | 4/1994 | Lucid et al. ......................... 104/34 X |

FOREIGN PATENT DOCUMENTS

228902  9/1988  Japan .
2108443  5/1983  United Kingdom .

Primary Examiner—Edward H. Tso

[57] ABSTRACT

An integrated electric vehicle service station system for managing the exchange of heavy and bulky battery assemblies in electric vehicles. The battery exchange system includes a battery platform for supporting an assembly of batteries for the vehicle, a vehicle platform support structure within an electric vehicle for receiving and supporting the battery platform, and a mechanized vehicle service station facility for exchanging recharged battery platforms with spent platforms mounted on-board electric vehicles. The battery platform is of a simple modular shape that may be used with the large variety of sizes and shapes of electric vehicles that may be expected in the future. The battery platform support structure is a correspondingly simple structure that may readily be included in electric vehicles of widely differing designs. The service station facility includes two general service substations—an exchange substation where the spent battery platform is removed from the vehicles and replaced with a fully charged platform, and a staging substation where the battery platforms are stored, re-charged, serviced, and staged for insertion into a waiting vehicle at the exchange substation. The exchange substation is such that the exchange of a battery platform for an electric vehicle positioned at the exchange substation is able to proceed automatically and rapidly with a minimum of operator assistance so as to minimize the inconvenience to the vehicle operator.

4 Claims, 10 Drawing Sheets

BATTERY EXCHANGE SYSTEM FOR ELECTRIC VEHICLES

BACKGROUND OF THE INVENTION

The invention relates to systems for supplying battery-powered electric vehicles with fully charged batteries.

The disadvantages of vehicles powered by an on-board supply of fossil fuel are well recognized. Electric vehicles have long been proffered as a desirable alternative potentially having a less harmful impact on the environment and reducing noise pollution without compromising power. Successful electric vehicle systems have been implemented for mass transportation where the electric power is provided to the vehicles by overhead wires for trolleys and electric buses on fixed routes or by third rails for electric trains on fixed track. Systems have also been proposed in which the electrical energy is delivered to the moving vehicle without attached wires through electromagnetic induction. These systems generally require a fixed underground induction track.

The electrically powered automobile and truck, however, present a different problem because they must carry their electrical energy with them in storage batteries. Battery-powered electric vehicles have the major drawback that they have a limited range before the batteries wear down and need recharging. This problem is faced by fossil-fuel powered vehicles, too, which must also carry their fuel with them. Unlike the electric vehicles, however, gasoline and diesel vehicles have a well established distribution system for re-fueling the vehicle in practically any locality on demand. Service stations providing gasoline and diesel fuel are well distributed along highways and throughout urban and rural regions alike.

As one way of increasing the range of electric vehicles, designers have sought to improve the design of the vehicles themselves. They have tried to make the vehicles lighter and have aimed at more aerodynamically efficient shapes to reduce air resistance. The battery assemblies, which may weigh as much as 800 pounds (365 kilograms) or so, have tended to be located in the center of the vehicle in the vicinity of the vehicle center of gravity for better performance. Improved designs have also been made to the batteries themselves so that they are lighter, or have a greater capacity for their size or weight, or can be recharged faster or more efficiently.

Examples of electric vehicle designs incorporating large battery assemblies are shown in U.S. Pat. Nos. 3,983,952 and 4,216,839 and British Patent No. 2,108,443. U.S. Pat. No. 3,983,952 to McKee discloses an electric vehicle using a long roll-out tray of batteries easily rolled into or from a housing which also comprises a structural backbone of the vehicle. The roll-out tray of batteries is accessible from the front of the vehicle. U. S. Pat. No. 4,216,839 to Gould discloses an electric vehicle with minimum weight by utilizing a combined body and chassis formed entirely of plastic material, molded and bonded into an integral composite structure which includes a central longitudinal hollow beam which holds the batteries for powering the vehicle. The batteries rest on slidable trays in the hollow beam. To replace the batteries, the trays are slid out of the hollow beam from the front of the vehicle and new batteries are slid back into the beam on the trays. British Patent No. 2,108,443 to Appleyard discloses an electric vehicle with a chassis containing one or more traction battery cassettes adapted for easy removal for recharging and replacement by cassettes or recharged batteries. The battery cassette handler inside the vehicle comprises lifting cables, an actuator for the cables, brackets, and pins or other engagement means for supporting the cassette from the brackets when lifted into position.

Other patents show devices for installing and removing the battery assemblies from the vehicle for charging or exchange. U.S. Pat. No. 3,799,063 to Reed discloses an electric vehicle battery changing and positioning device that includes lift arms pivotally (and permanently) mounted to the vehicle frame. The arms are attached at their free ends to a battery tray and cover. The arms may be hydraulically rotated to move the battery tray and cover through an arc from an inner position on the vehicle to an outer position spaced from the vehicle to facilitate changing or servicing. U.S. Pat. No. 3,834,563 to Teti discloses a battery carrier for moving the batteries of mine tractors and the like into and out of a receiving compartment. Like the Reed patent, the Teti device includes pivoted arms, the free ends of which support the battery or batteries. The arms pivot to move the batteries into and out of their compartment.

Yet other patents are directed to facilities for exchanging battery assemblies. U.S. Pat. No. 4,334,819 to Hammerslag discloses a battery charging system for battery powered vehicles at a battery transfer station. The battery is removed from the vehicle and transferred to either a conveyor charging system or to storage and charging bays. The battery is removed from above, out of the vehicle's trunk through a crane that lifts the battery out of the vehicle and onto the conveyor system. U.S. Pat. No. 5,091,687 to Meyer discloses a charging system with a circular magazine which is pivotable about a central axis. A gripper device pulls the battery out of the side of the vehicle and into the circular magazine whereby another battery is pushed into the vehicle from the circular magazine. U.S. Pat. No. 4,450,400 to Gwyn discloses a battery replacement system for electric vehicles with a carriage-elevator structure which is arranged in front of a battery station to transfer selected batteries between the charging station and a parked stationary vehicle. The vehicle and the charging station are provided with roller support units adapted to bear the battery weight and permit manual pushing and/or pulling of individual batteries to or from the elevator. The batteries are rolled out of the rear of the vehicle and onto the elevator and a new charged battery is put in its place. U.S. Pat. No. 4,102,273 to Merkle et al. addresses the problem of positioning an electric vehicle at a station for replacing the batteries. The Merkle patent provides a carriage device for moving the whole vehicle forward and back over a lift or dolly for replacement of the batteries.

The above examples represent a haphazard approach to the problem of dealing with 800-pound (365-kilogram), bulky battery assemblies for electric vehicles. The known approaches involve a compromise in ease of use or convenience, are not such as to enable them to be adopted for widespread use, and do not necessarily provide adequate collision protection for the vehicle occupants or the batteries themselves.

SUMMARY OF THE INVENTION

The present invention provides an integrated electric vehicle service station system for managing the exchange of heavy and bulky battery assemblies in electric vehicles. With this system the vehicle batteries may be exchanged quickly and conveniently through a system of service stations providing a standardized battery exchange mechanism for universal adoption.

An integrated battery exchange system according to the invention includes a battery platform for supporting an assembly of batteries for the vehicle, a vehicle platform support structure within an electric vehicle for receiving and supporting the battery platform, and a mechanized vehicle service station facility for exchanging recharged battery platforms with spent platforms mounted on-board electric vehicles. The battery platform is of a simple modular shape that may be used with the large variety of sizes and shapes of electric vehicles that may be expected in the future. The battery platform support structure is a correspondingly simple structure that may readily be included in electric vehicles of widely differing designs. The service station facility includes two general service substations—an exchange substation where the spent battery platform is removed from the vehicles and replaced with a fully charged platform, and a staging substation where the battery platforms are stored, re-charged, serviced, and staged for insertion into a waiting vehicle at the exchange substation. The exchange substation is such that the exchange of a battery platform for an electric vehicle positioned at the exchange substation is able to proceed automatically and rapidly with a minimum of operator assistance so as to minimize the inconvenience to the vehicle operator.

Various aspects, advantages, and novel features of the invention are described below or will be readily apparent to those skilled in the art from the following specifications and drawings of illustrative embodiments.

DETAILED DESCRIPTION OF ILLUSTRATIVE EMBODIMENTS

Figure 1:
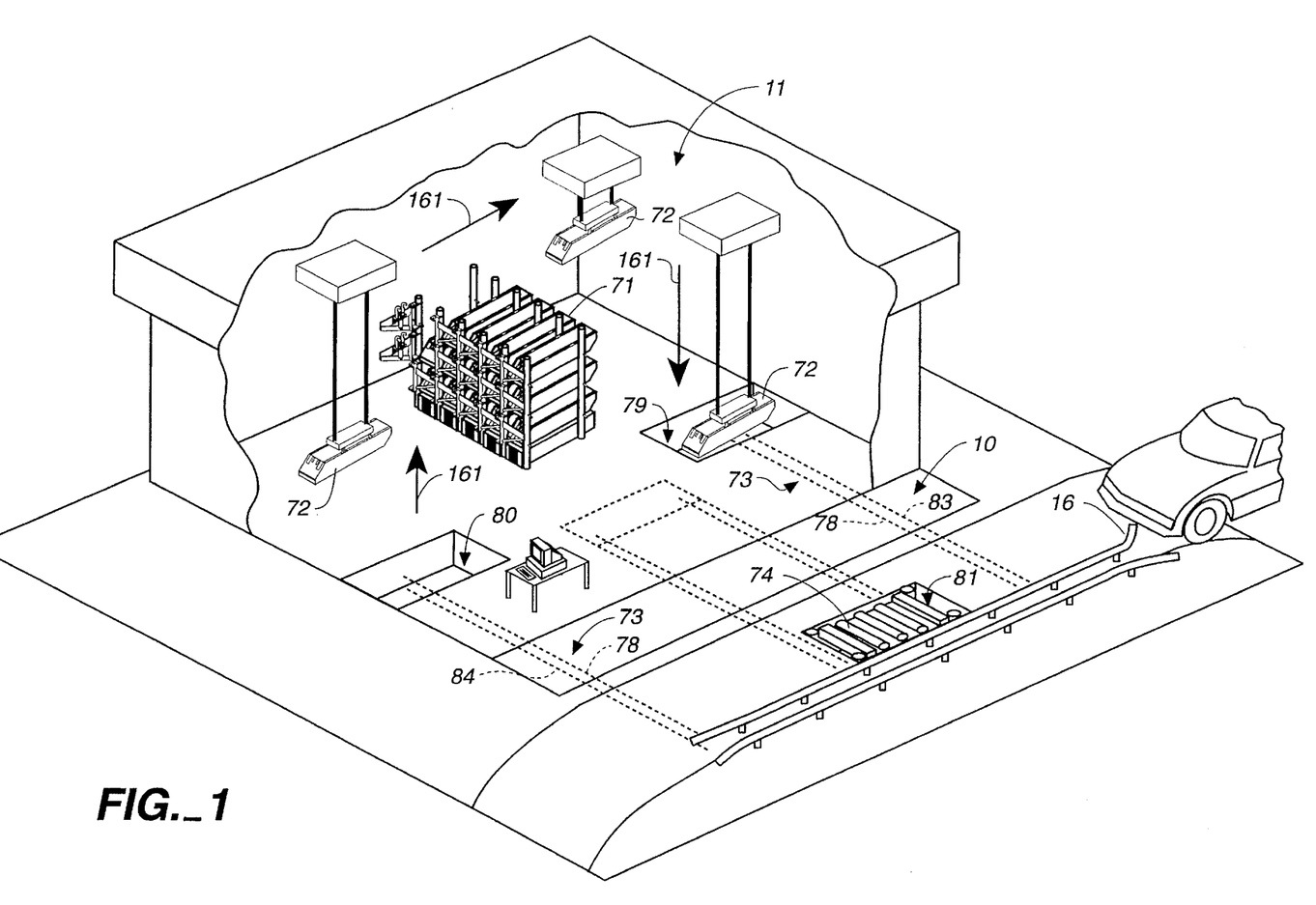
FIG. 1 is an overall perspective view of a service station facility according to the invention.

An integrated electric vehicle service station system according to the invention includes three separate cooperating elements or pieces: a battery platform, which contains the batteries for powering the electric vehicle; a support structure for the battery platform, which forms a part of the electric vehicle itself and supports the battery platform during the normal use of the vehicle and participates in the automatic release and re-installation of the platform during the exchange process; and a service station facility for automatically removing and replacing a battery platform in the vehicle's platform support structure. Illustrative embodiments of each of these component elements are addressed separately below. First, however, to provide orientation for the following exposition, an overall perspective view of an illustrative service station facility is shown in FIG. 1. The service station facility includes an exchange substation indicated generally by reference numeral 10 which is equipped, for example, to remove and replace the battery assembly from a vehicle positioned at the station. The facility also includes a staging substation indicated generally by reference numeral 11 which is equipped to re-charge spent battery assemblies in bulk, to select, manipulate and maneuver re-charged battery assemblies into position for loading into electric vehicles at exchange substation 10, and to perform other maintenance and service functions. The various actions at the substations 10 and 11 are highly automated.

Battery Platform

Figures 2, 3:
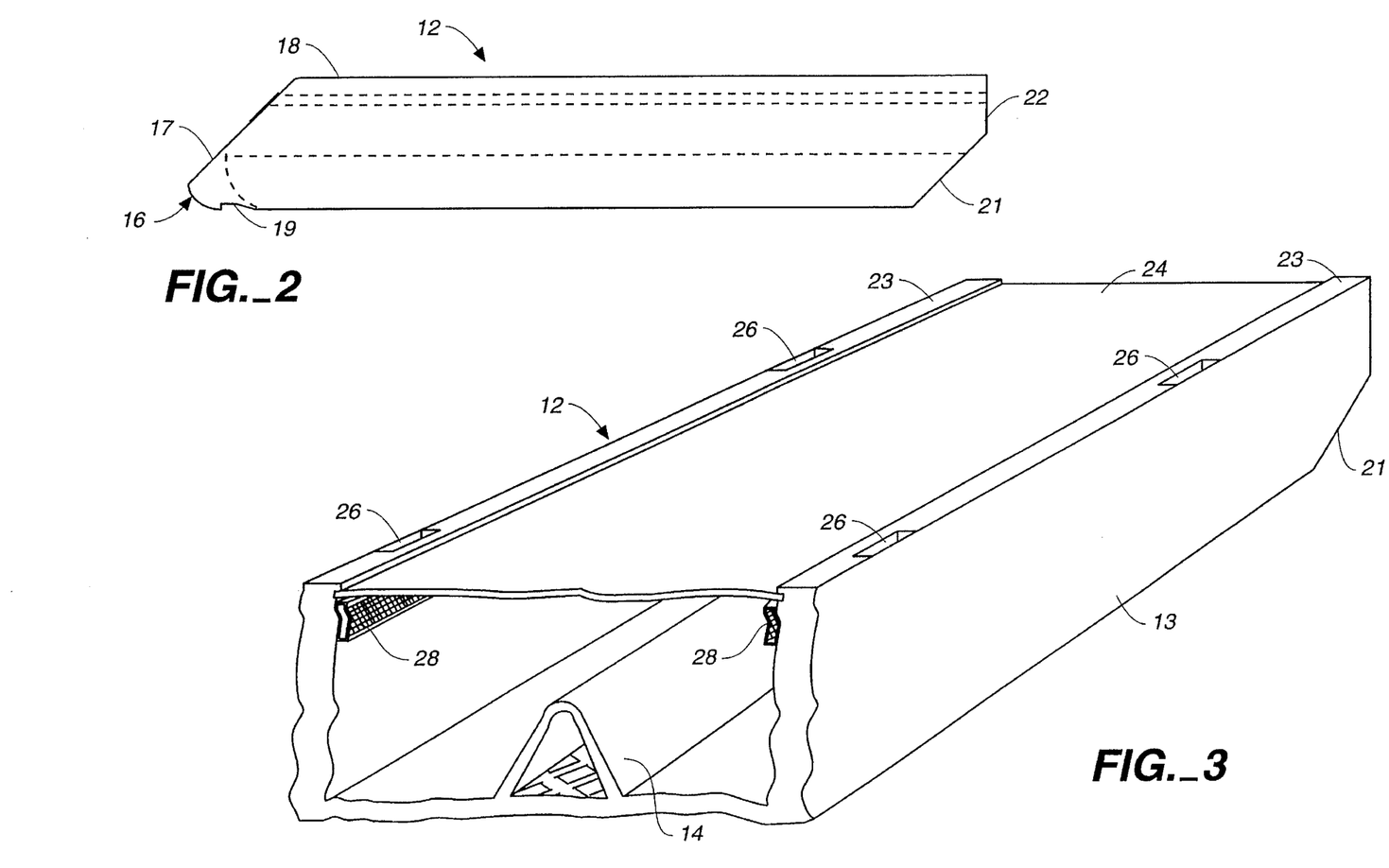
FIG. 2 is a side elevational view of a battery platform.
FIG. 3 is a perspective view of a section of a battery platform.
Figure 4:
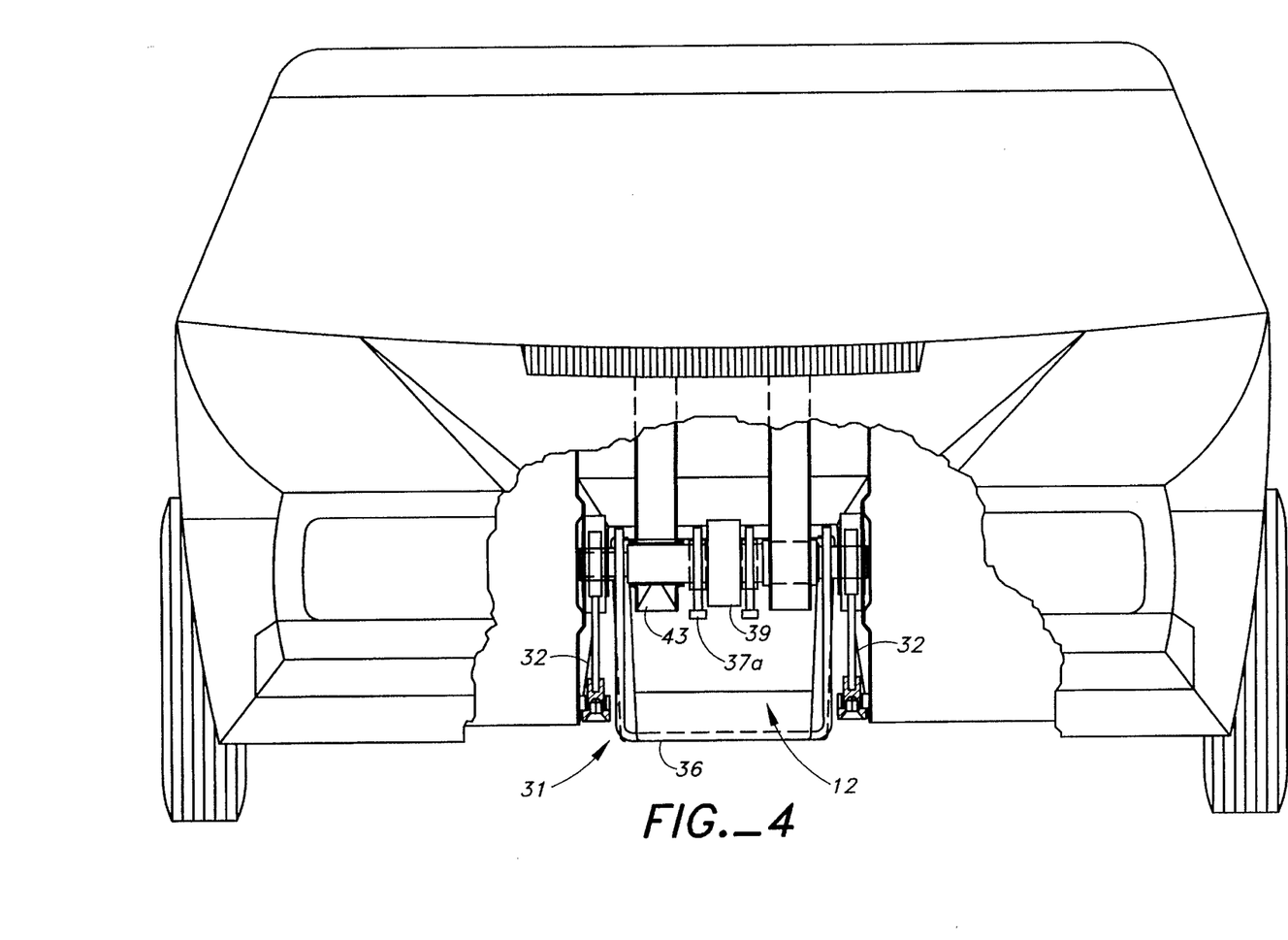
FIG. 4 is a front elevational view of a vehicle partially cut away to show a battery platform mounted in position.

An embodiment of the battery platform is described with reference to FIGS. 2 and 3. Battery platform 12 contains sufficient storage batteries, or equivalent replaceable or rechargeable modular electric energy units, for powering the electric vehicle and provides a self-contained interchangeable module that may be removed and replaced as a unit in the vehicle. The term "batteries" as used herein should be understood in a broad sense encompassing replaceable electrical energy-providing modules of any kind whether commonly denominated "batteries," "storage cells," or some other nomenclature. The platform is structured to assist in the automatic removal and replacement from the vehicle and may also be equipped to monitor the electrical condition and charge history of the batteries.

Battery platform 12 comprises a container 13 for holding a plurality of individual batteries securely against movement of the platform either when mounted in a vehicle or when being transported to and from the vehicle. Container 13 has an elongate shape with the long dimension to be mounted congruent to the centerline of the vehicle. The container includes a central web 14 running along the longitudinal dimension of the container for providing structural reinforcement and for dividing the container into left and right troughs or compartments for securely housing batteries in the separate sections or partitions of the platform. As will be understood by those skilled in the art container 13 is formed of materials having sufficient strength and with sufficient reinforcing structures to support the weight of the batteries contained therein, and to protect the battery platform against rupture or penetrating impact in the event of a collision. Platform 12 may also be provided with a reinforcing "crash plate" on its underside to protect the batteries against impact from below should the vehicle be driven over inhospitable terrain. Container 13 should of course also be formed with sufficient independent strength to support and protect its contents when detached from the vehicle against the possibly erratic movements and impacts the platform may experience as it is repeatedly moved to and from vehicles, battery charging stations, and storage areas. The particular design of a container 13 to meet these demands is routine as will readily be appreciated by those skilled in the art, and the details of the design may be omitted here.

The forward and rear portions of battery platform 13 are structured to facilitate loading and unloading from the vehicle. For example, the forward portion may be formed with a generally rounded nose portion 16 at the lower forward extremity of container 13 and a forward oblique surface 17 sloping upward and rearward from nose portion 16 to the container top wall 18. Generally rounded nose portion 16 facilitates the movement of a cradle arm assembly discussed below in securing platform 12 in position on the vehicle. Oblique surface 17 serves to guide the forward portion of container 13 into its mounted position. The platform is formed with an indentation 19 that is used to cinch the platform into position in the vehicle. As a safety measure, nose portion 16 is structurally reinforced so as to sustain heavy impacts and at least partially insulate the batteries in the container from the brunt of a potentially damaging impact force. The rear portion of container 13 is formed with a rear oblique surface 21 at its lower rear extremity sloping upward and rearward to meet the container rear wall 22. Rear upward sloping surface 21 cooperates with the battery platform support structure on the vehicle to urge the platform forward into its mounted position.

Platform 12 is formed with a lip 23 that runs the length of container 13 at the top edge of the sidewalls and includes a sliding upper panel 24 which slides between the lips 23. Upper panel 24 allows access to the interior of container 13 for battery maintenance and replacement. Lips 23 on each side of the platform contain two hook openings 26, which are used for securing the platform while it is moved during a battery exchange.

Platform 12 is also provided with a venting arrangement such as illustrated by vent channels 28 to permit any fumes given off by the enclosed batteries to be vented. In FIG. 3 vent channels 28 are formed with a mesh inward face permitting air circulation with the interior of container 13. The platform vent channels 28 are formed to be coupled to counterpart vehicle vents to provide a circulation path for air through container 13 via intake and outflow vents on the vehicle (reference numerals 63, 64 in FIG. 7). This defines a general-purpose circulation path for cooling or heating of batteries as well as for exhausting fumes. The platform itself is intended to be universal, i.e., suitable for use with a variety of battery types which may operate under varied temperatures or other environmental conditions calling for a circulation path through the battery compartment.

Platform 12 may also include an electronics module for keeping track of the platform maintenance and charge history. The electronics module may track such data as the number and/or dates of past battery re-charging operations, the present charge level, the history of charge usage, and past and future maintenance schedules. Platform 12 also includes an electrical connector for electrically connecting battery platform 12 with the vehicle for displaying battery charge as well as service and malfunction warnings to the driver of the vehicle.

In an alternative embodiment, battery platform 12 may also be configured with two separate areas for receiving two separate battery assemblies. The first assembly is the main power source for propelling the vehicle. The second assembly may be used as an independent power source for such auxiliary functions as lights, power windows, radio, telephone or CB radio so as not to leave the driver stranded when the primary power source is too low to propel the vehicle. In this embodiment platform 12 may be provided with a second electrical connection for reporting the auxiliary power status to the driver.

Vehicle On-Board Support Structure For Battery Platform

The platform support structure in the vehicle is described with reference to FIGS. 4–7. The support structure includes a platform housing bay 31 defined within the central region of the vehicle frame on the underside of the vehicle so as to be accessible from underneath. Platform housing bay 31 has an elongate shape extending generally along the center line of the vehicle and is generally shaped to receive battery platform 12. The bay is formed so as to guide battery platform 12 into its operative position in the bay. In the illustrated embodiment the guide means is provided by the shape of platform housing bay 31 itself, which is formed with slightly sloping sidewalls 32 closer at the top than at the bottom to guide the battery platform into position. As configured here the platform housing bay receives the battery platform from underneath the vehicle. A force roller 33 is attached to the vehicle frame at the rear end of the platform housing, that is, at the end at which the battery platform is received. The roller 33 is disposed to apply a generally forward-acting force to the rear portion of the battery platform to urge the platform into position and support the platform.

Figure 5:
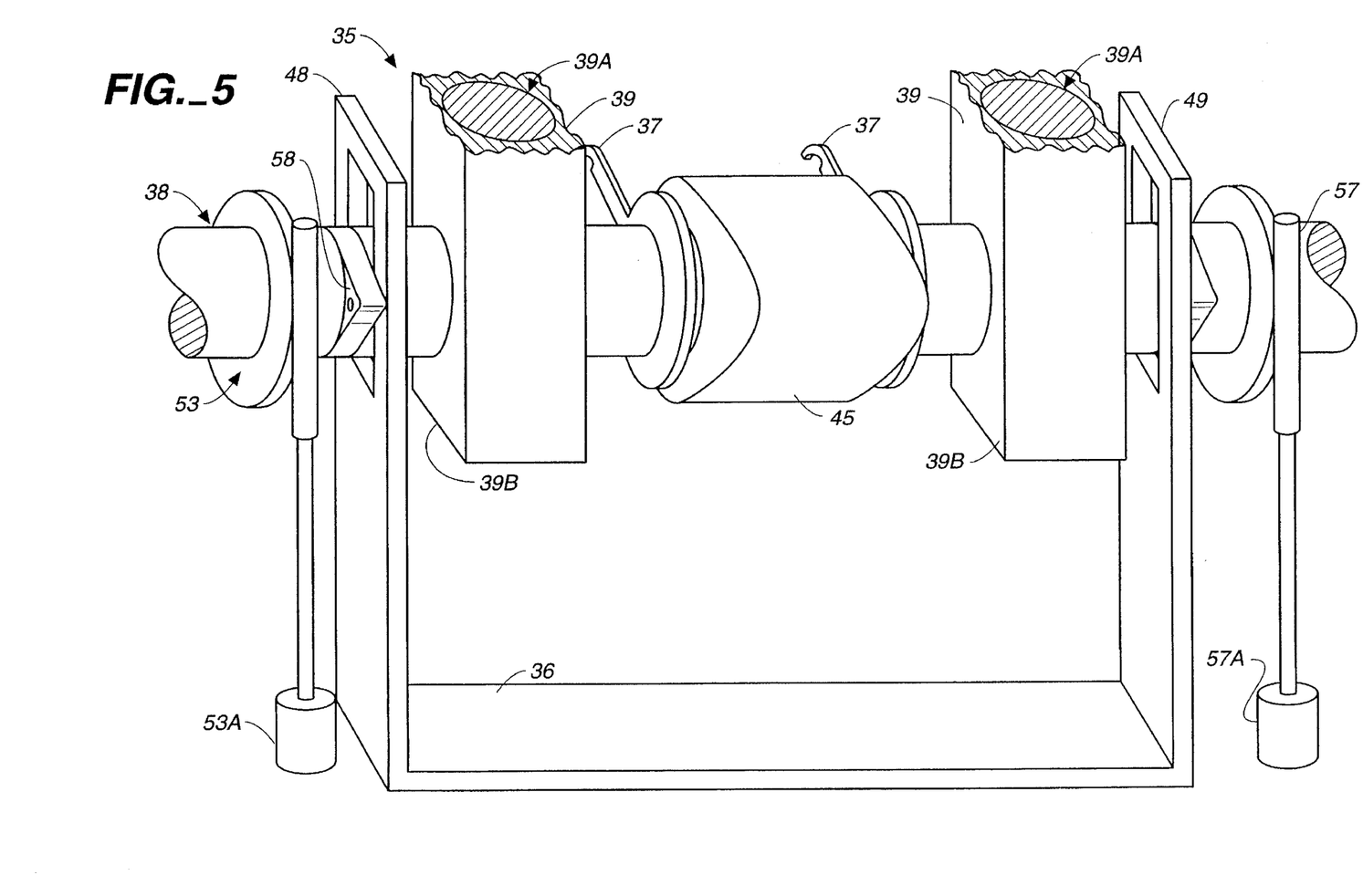
FIG. 5 is an isometric view of the cradle arm assembly structure.

At the forward end of platform housing bay 31 is a cradle arm assembly 35 shown in FIG. 5, which receives the battery platform and urges it into its secure position in the housing bay and serves to retain the battery platform in its secure position under conditions of operation of the vehicle. The assembly includes a movable cradle arm 36 for supporting the battery platform and a movable plug arm 37 for making an electrical connection with the battery platform. Cradle arm 36 and plug arm 37 are supported by a contact pivot support beam 38. Support beam 38 is secured to the vehicle frame by frame members 39. The frame members 39 may be conveniently formed with hollow interiors as illustrated at reference numeral 39a to serve as vent conduits. The lower ends of frame members 39 are formed with openings communicating with the hollow interior 39a and mate with the ends of vents 28 in the battery platform. The upper extremities of the frame members are coupled to vent intakes 63 (see FIG. 6) in the vehicle. The lower ends of frame members 39 are sloped as indicated at reference numerals 39b to mate with the sloping nose 17 of the battery platform. The lower frame member ends will generally be provided with a closure member providing a cushioning and sealing function as the lower frame member ends align with the battery platform vents.

Figure 6:
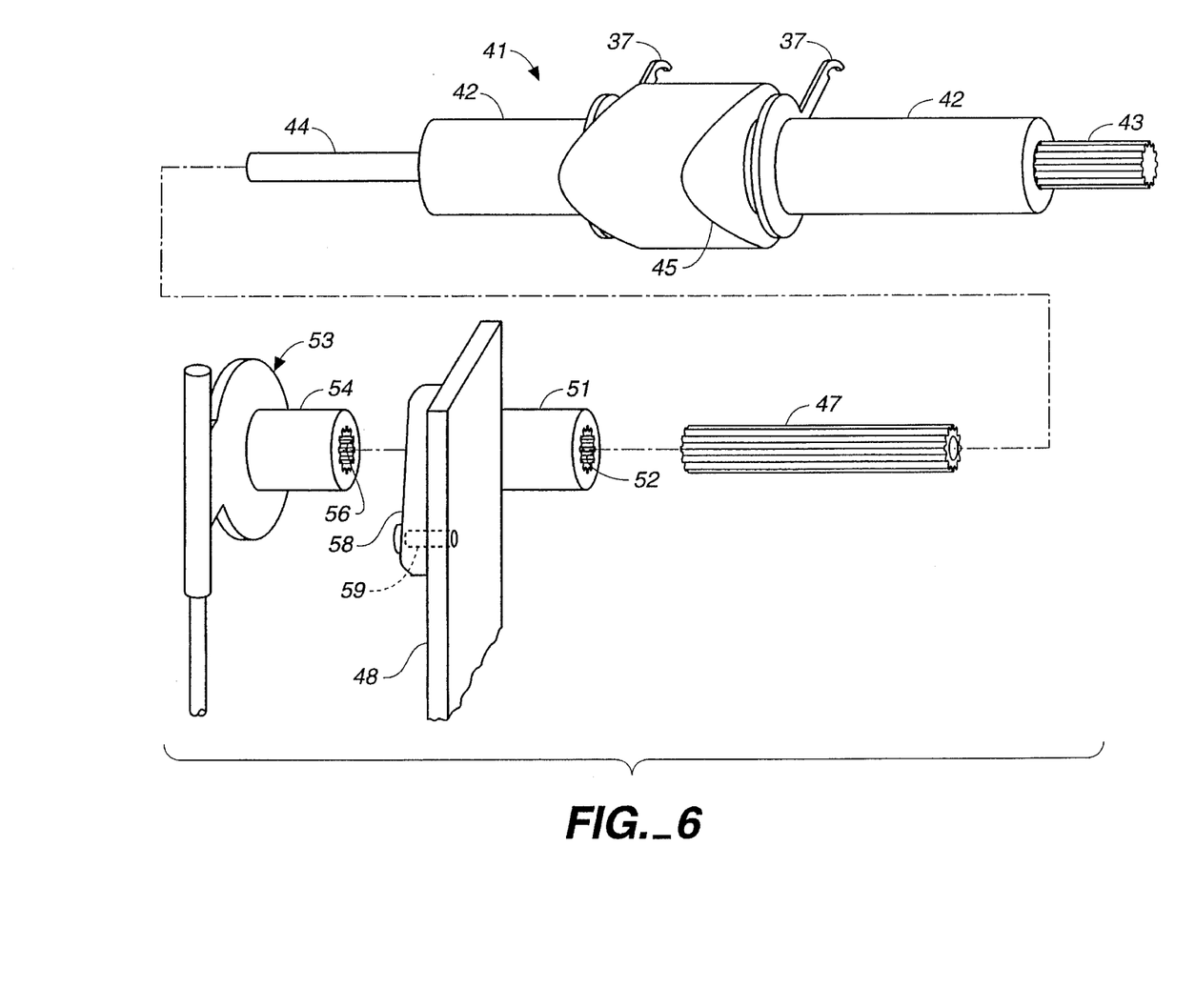
FIG. 6 is an exploded perspective view of a pivot arm support beam assembly from the cradle arm assembly of FIG. 5.

In the embodiment illustrated here pivot arm support beam 38 has a compound structure shown in greater detail in FIG. 6. A base shaft member 41 includes an intermediate shaft 42, a splined shaft 43 extending from a first end of intermediate shaft 42, and a smooth shaft 44 extending from the other end of intermediate shaft 42. Smooth shaft 44 is of lesser diameter than splined shaft 43. In the central region of intermediate shaft 42 are mounted plug arms 37, which are fixed to rotate with intermediate shaft 42. Also mounted on intermediate shaft 42 is a rubberized protective bumper 45, which cushions any impact on pivot arm support assembly 38 as the battery platform is installed in the battery housing bay. Protective bumper 45 is shown in FIGS. 5 and 6 with a slight eccentric shape. As the upper surface of the battery platform contacts the eccentric end of the bumper (the upper surface may be formed with a central raised portion for this purpose), the cam action turns plug arm 37 into the approximate orientation needed for alignment with a receiving outlet on the battery platform. This action serves to protect the plug arm from damage by the battery platform in the event the plug arm might have become positioned in a downward orientation as the battery platform is installed. A separate auxiliary shaft 47 has a splined outer surface of the same diameter as splined shaft 43 and has a central bore dimensioned to receive shaft 44. In assembled configuration auxiliary shaft 47 rides on shaft 44. Cradle arm 36 has a driven end 48 and a passive end 49. Driven end 48 is secured to cradle arm drive shaft 51, which has a splined inner bore 52 mating with the splined outer surface of auxiliary shaft 47. In assembled configuration drive shaft 51 rides on auxiliary shaft 47 and is driven by shaft 47. Auxiliary shaft 47 is itself driven by worm drive 53, which includes connecting shaft 54 having a splined inner bore 56 mating with the splined outer surface of auxiliary shaft 47. Worm gear 53 is used to rotate cradle arm 36 into and out of position supporting the battery platform. A second worm drive 57 (not shown in FIG. 6) mounts on shaft 43 in the same manner as worm drive 53 and shaft 47. The second worm drive 57 is used to rotate the base shaft 41, which rotates plug arm 37 between a contact position, in which it electrically engages the battery platform, and a release position, in which it is clear of the battery platform. Worm drives 53 and 57 include drive sockets 53*a* and 57*a*, respectively, by which the worm drives may be turned. Plug arm 37 terminates in an electrical plug mating with a counterpart receptacle, illustrated diagrammatically at 37*a* in FIG. 4, on the battery platform for establishing the electrical connection between the battery platform and the vehicle.

Figure 7:
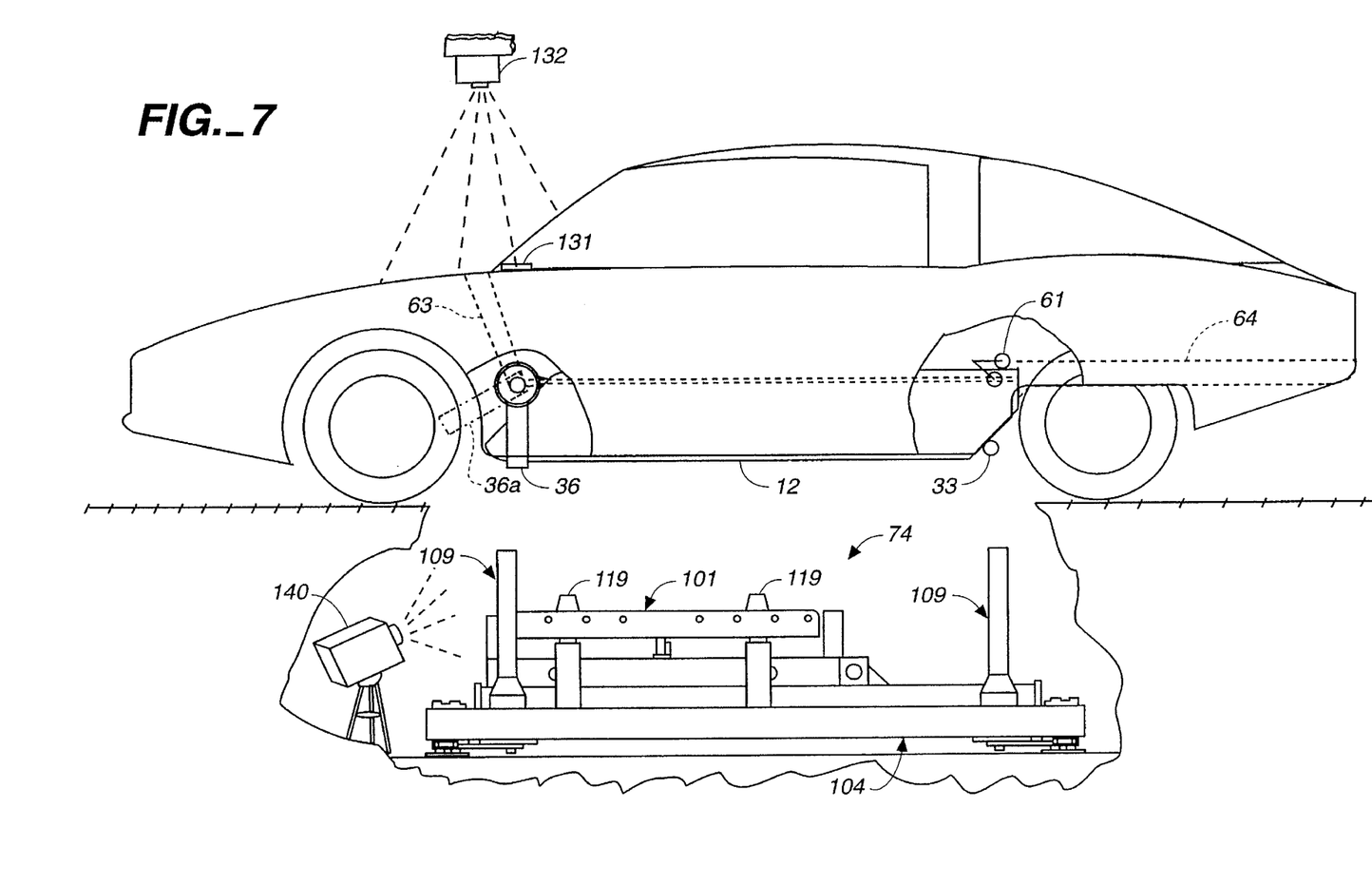
FIG. 7 is an elevational view of a vehicle at an exchange substation with the exchange station partially cut away.

Cradle arm 36 rotates between an engaged position, in which the cradle arm engages and supports the battery platform, and a retracted or release position, in which the battery platform is free to be removed. In FIG. 7 cradle arm 36 is shown in its engaged position, and phantom cradle arm 36*a* is shown in its retracted position. To provide clearance for cradle arm 36 as it swings into and out of position, cradle arm assembly 35 includes a toggle 58, which is secured to rotate with drive shaft 51. (For presentation purposes, the orientation of toggle 58 is reversed in FIGS. 5 and 6 to make it more visible.) Toggle 58 is pinned to the cradle arm side member by pin 59 so that the toggle is free to rotate about the pin. In operation, worm drive 53 is caused to rotate by inserting an appropriate tool into drive socket 53*a*. Worm drive 53 rotates drive shaft 51, which in turn pivots toggle 58, which acts as an off-center toggle to the support beam. Because of the offset by toggle 58 is connected to the cradle arm side member, cradle arm 36 is caused to rotate and to provide increasing clearance as the cradle arm swings toward its retracted position. This clearance permits the cradle arm to extend underneath the nose 16 of battery platform 12 and cinch at the platform indentation 34 pulling the platform snugly up against the support frame members 39 and protective bumper 45. Rear upward sloping surface 21 cooperates with forward force roller 33 to urge the platform forward into its mounted position. Forward force roller 33, attached to the frame of the vehicle, engages container 13 along rear oblique surface 21, which diverts a portion of the downwardly acting weight of platform 12 to a forward force maintaining platform 12 in its mounted position. Arranged in this manner, the primary center is in the contact pivot support beam 38, and the secondary center is in the pivot of cradle arm 36, which is eccentric to the pivot center of contact pivot support beam 38. After cradle arm 36 is locked in place, worm drive 57 may be turned to pivot plug arm 37 so as to engage battery platform 12. This arrangement utilizes gravity to force the battery platform, under the action of its own weight, toward the front of the vehicle and against cradle arm 36 and provides a weight distribution urging the battery platform securely in place during normal operation of the vehicle.

A limit sensing roller 61 is mounted at the upper portion of the rear end of the platform housing bay. This roller acts as a limit switch for sensing when battery platform 12 has been moved into its secured position. Limit roller 61 provides an indicating signal when the battery platform is in position.

The vehicle is provided with intake vents 63 and outflow vents 64, illustrated diagrammatically in FIG. 7, (separate from passenger compartment vents) for dissipating any potential noxious fumes from the batteries located in platform 12. The vents 63 and 64 in the vehicle communicate with the counterpart vent channels 28 in battery platform 12 to provide venting air flow through the battery platform.

The vehicle is also provided with appropriate electrical connections at the platform support structure (at plug arm 37 of the cradle arm assembly) for connection to the battery platform not only for communicating electrical power, but also for monitoring the electrical charge status of the battery assembly and displaying this information inside the passenger compartment of the vehicle.

Service station facility

The service station facility is described with reference to FIGS. 1 and 7–12. As indicated above, and as illustrated in FIG. 1, the service station facility includes exchange substation 10 and staging substation 11. Exchange substation 10 is the location where the battery exchange takes place. The substation is outfitted to extract a battery platform from a vehicle positioned at the substation 10, insert a recharged platform, and handle all the necessary intermediate manipulations of the spent and charged battery platforms. Staging substation 11 is the area where battery platforms are stored and prepared for exchange, and may be recharged and serviced. As illustrated here, the staging substation is located in an enclosed building and includes one or more storage racks 71 with a supply of battery platforms in each rack and a platform manipulator 72 for moving battery platforms to and from the storage racks. Exchange substation 10 will generally be included within the same building or sheltered in some other way from the elements. A platform conveyance mechanism indicated generally at 73 is provided for moving the battery platforms between staging substation 11 and exchange substation 10. A lift 74 is provided at exchange substation 10 for moving a battery platform between a vehicle at the substation and the conveyance mechanism.

As illustrated here, conveyance mechanism 73 is provided by an underground guide rail trolley conveyor system including one or more trolleys 77 for holding a battery platform which moves along a guide rail 78. Access to the trolley and rail is provided through pits 79 and 80 within staging substation 11 and through a pit 81 at exchange substation 10. The conveyance mechanism guide rail 78 follows a path having two arms 83 and 84. The first arm 83 carries a trolley between a first staging access pit 79 and access pit 81 at the exchange substation, and the second arm 84 carries a trolley between the exchange substation pit 81 and the second staging pit 80. At access pit 79 a platform manipulator 72 places a fresh battery platform on the trolley, which carries the platform to exchange substation 10. Lift 74 positioned at pit 81 receives the spent battery platform from a vehicle parked at the exchange substation and transfers the spent platform to a trolley waiting on arm 84, which delivers the platform to pit 80 where manipulator 72 removes the platform from the trolley. At exchange pit 81 lift 74 then receives the fresh platform from the trolley on arm 83 for installation in the waiting vehicle. While only a single path geometry is shown here for purposes of illustration, those skilled in the art will appreciate that other geometries are also possible. For example, for a facility with multiple exchange substations 10 pickup and delivery path arms will be needed for each exchange substation, and for large facilities the path may also run to several staging substations within the building as well as to battery storage and service areas. Moreover, although separate delivery and pickup arms 83 and 84 are illustrated here for each exchange substation 10, the path may also be configured with only a single arm serving both the delivery and pickup functions. In this configuration a single trolley receives a fresh battery platform and travels along the single arm to access pit 81, where the fresh platform is exchanged with a spent one waiting on lift 74, after which the trolley returns to the staging substation along the same arm with the spent platform.

The conveyor system is now described with reference to FIGS. 8 and 9. The system illustrated here is a monorail system, which is advantageous because of its simplicity and because with only a single rail it will generally be less costly, but other arrangements may also be used. In any event a self-guided system is beneficial because it reduces the need for operator control.

Figure 8:
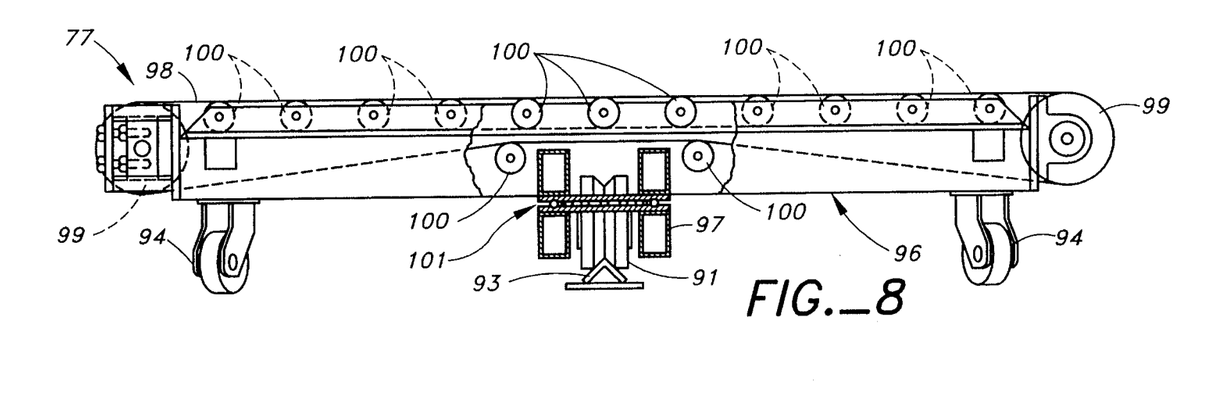
FIG. 8 is a front elevational view, partially in section, of a trolley for transporting battery platforms.
Figure 9:
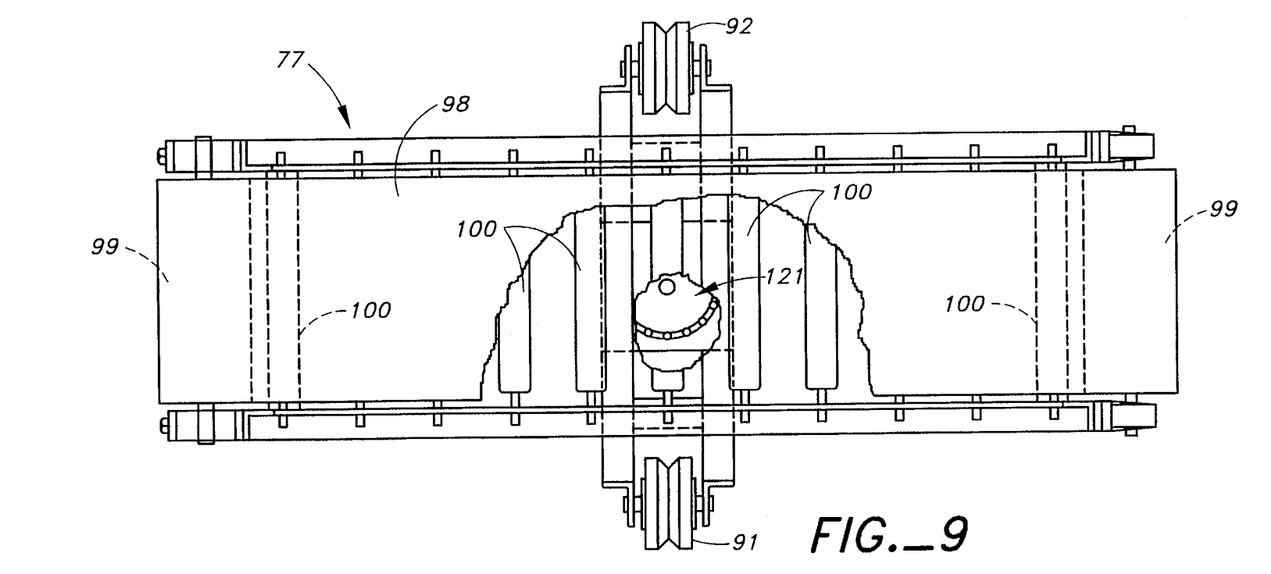
FIG. 9 is a plan view, partially cut away, of the trolley of FIG. 8.

Trolley 77 includes a pair of fore and aft wheels 91 and 92 structured to ride on guide rail 93, such as the V-groove wheel 91 and mating V-shaped rail 93 shown in FIG. 8. Trolley 77 is stabilized on rail 93 by a pair of outrigger castors 94. A conveyor platform 96 is supported on fore and aft wheel base 97, and is disposed to run generally perpendicular to wheel base 97, i.e., perpendicular to guide rail 93. Conveyor platform 96 is of the type known as a handoff conveyor. It includes an endless belt 98, which runs over a plurality of motorized drive rollers 99 for propelling the belt and a plurality of free rollers 80 for supporting the belt. Motorized rollers 99 are activated at appropriate times for transferring a battery platform between trolley 77 and lift 74. Two drive rollers are shown in the figures, but the handoff conveyor may be configured in a variety of ways with more or fewer rollers.

Figure 10:
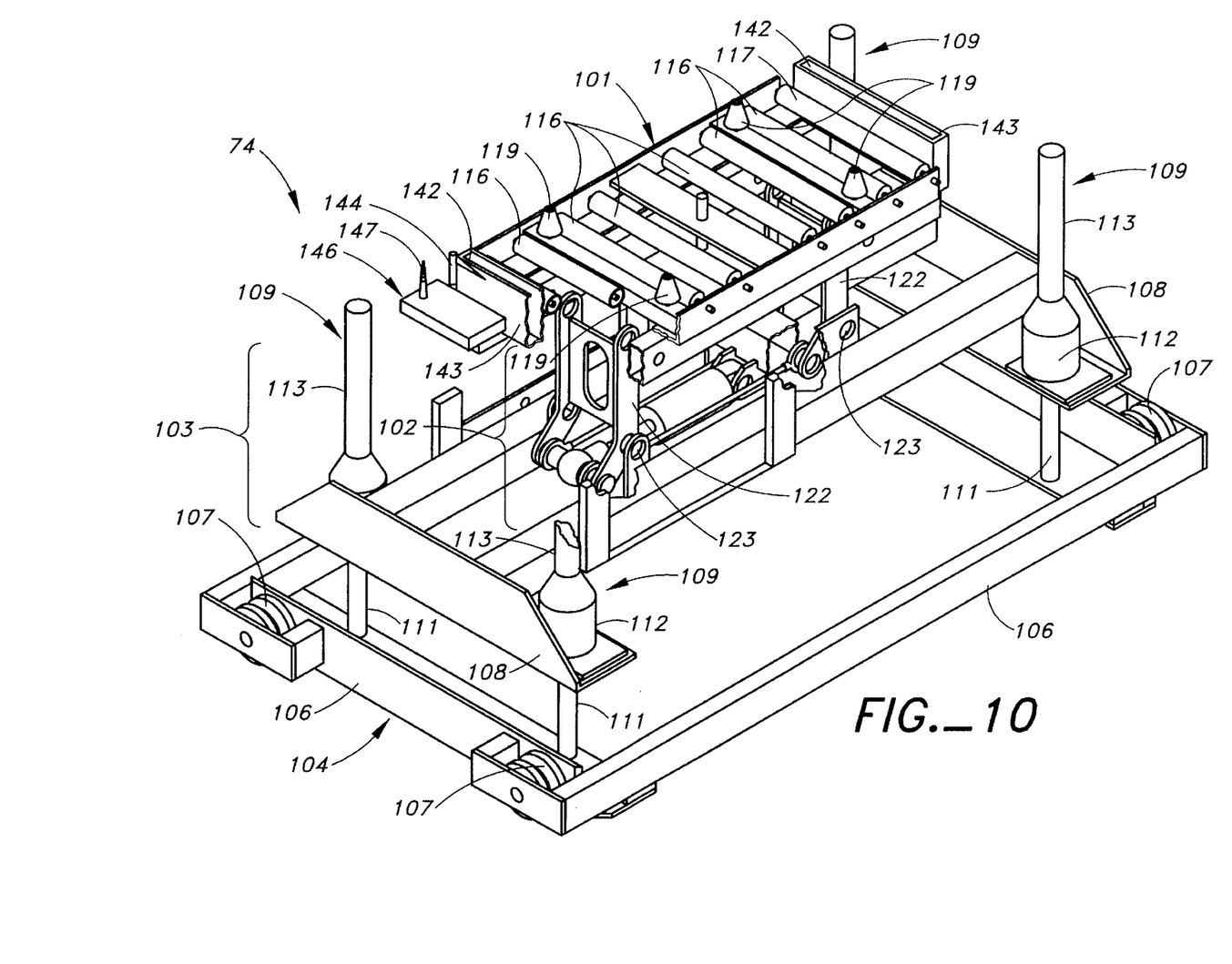
FIG. 10 is an isometric view of a lift for handling the battery platforms at an exchange substation.

An embodiment of lift 74 positioned at exchange substation 10 under the vehicle is now described with reference to FIGS. 1, 7 and 10. Lift 74 includes a conveyor rack 101 and secondary lift assembly 102 for receiving a battery platform and an elevator assembly indicated generally at 103. The lift rests on a guide rail framework 104 including base frame 106 and V-groove wheels 107 formed to ride on a pair of V-shaped guide rails, which are arranged to run generally perpendicular to the direction of motion of a vehicle at exchange substation 10. Resting the lift on a movable guided platform as illustrated here enables fine adjustments to be made in the lateral positioning of the lift under the vehicle. Resting the lift on a movable platform is also convenient for servicing and routine maintenance of the lift. To this end, the guide rail tracks may be laid out to carry the lift from exchange substation 10 to a lift service area within the staging substation building.

Elevator assembly 103 includes a support frame indicated generally at 108 and four extensible elevator mechanisms 109. A variety of mechanical arrangements may be used to provide the elevator mechanism. Each elevator mechanism 109 is driven by a reciprocating ball screw mechanism including ball screw actuator rod 111, a ball screw assembly within ball screw housing 112, and actuator rod receiving tower 113. As illustrated here elevator mechanisms 109 are driven by a motor (not shown) in conventional manner, although, if desired, pneumatic or hydraulic mechanisms may also be used for this purpose.

To pass a battery platform back and forth between an overhead vehicle and a waiting trolley 77, conveyor rack 101 is provided with a handoff conveyor segment. For this purpose conveyor rack 1 01 includes both free rollers 116 and driven rollers 117. Conventional roller drive mechanisms for powering the driven rollers are well known and for this reason have been omitted from the drawings here so as not to overly complicate, and thereby obscure, the drawings.

Conveyor rack 101 includes four universal positioning guides 119 for receiving and positioning the edges of a battery platform. Positioning guides 119 illustrated in FIG. 10 have the shape of inverted truncated cones. Secondary lift assembly 102 and conveyor rack 101 are both supported on a thrust bearing 121 (see FIG. 9), which enables the secondary lift assembly and conveyor rack mounted thereon to rotate as a unit about a vertical axis when a spent platform is brought to rest on them. Positioning guides 119 automatically cause the supporting conveyor rack to twist through the action of the thrust bearing, and this causes the conveyor rack to conform to the angular disposition of the spent platform.

Secondary lift assembly 102 raises and lowers conveyor rack 101 with respect to elevator assembly support frame 108. The secondary lift assembly provides for fine adjustments in raising and lowering the battery platform and also provides for alignment of the platform. Secondary lift assembly 102 includes angulated lift arms 122 for raising and lowering the conveyor rack. As illustrated here lift arms 122 are pinned at elbows 123 so that the distal ends of arms 122 supporting the conveyor rack move along a segment of a circular path. Such a movement path provides for more gradual and thus more delicate raising and lowering and also provides a lateral component of the movement which assists in inserting and removing a battery platform in and from a platform housing bay 31 in an overhead vehicle. Other mechanisms may also be used such as eccentric cam mechanisms for providing lift arms following other motion profiles. In this way the movement of the battery platform as it approaches the platform housing bay 31 may be optimized. As an alternative embodiment, an electronic feedback mechanism under microprocessor control may also be provided for adjusting the speed and/or path of the battery platform as it is inserted into or removed from the platform housing bay. The secondary lift mechanism may be driven by a conventional pneumatic cylinder arrangement, although other arrangements could also be used.

For the service station facility to be able to insert a fresh battery platform into the housing bay of a vehicle smoothly and quickly, the fresh platform must be aligned with the housing bay. Since a battery platform may weigh as much as about 800 pounds (365 kilograms), even a slight misalignment may cause the platform to strike some portion of the vehicle or housing bay with considerable momentum and thus with great risk of damage to the vehicle and battery platform. The alignment problem is made difficult because the alignment depends both on the position of the vehicle at exchange substation 10 and on the location of the battery platform within the vehicle. The position of the battery platform within the vehicle of course depends on the make and model of vehicle, and the position and orientation of the vehicle at exchange substation 10 will vary depending on how the individual driver approaches and positions the vehicle at the substation for the exchange. To assist in positioning the vehicle for the exchange, the substation includes a means for defining a base position for the vehicle at the station, which puts the vehicle in a position to cooperate with the lift apparatus below for carrying out the exchange. The vehicle base position may be defined passively or actively. In a passive embodiment the driver positions the vehicle at the base position. In an active embodiment control is given over to position apparatus for establishing the final position of the vehicle for the exchange. In a simple passive embodiment, to assist in positioning the vehicle at a base position, exchange substation 10 is provided with vehicle guide markings and/or elevations such as raised guides 126. These guides extend alongside access pit 81 to guide the vehicle tires so as to position the vehicle in an approximately standard location over the pit. The guides may be formed of a rubberized material to prevent damage to the vehicle tires or wheels rims. Once positioned over access pit 81, the vehicle housing bay will still not generally lie in perfect registration with the underlying conveyor rack 101. To alleviate this problem, exchange substation 10 includes a mechanism for determining the alignment of the spent battery platform as it is removed from the vehicle, recording that alignment, and aligning the fresh battery platform with the removed spent platform so that it may be inserted into the vehicle housing bay along the same path the spent platform followed as it was removed.

Figure 11:
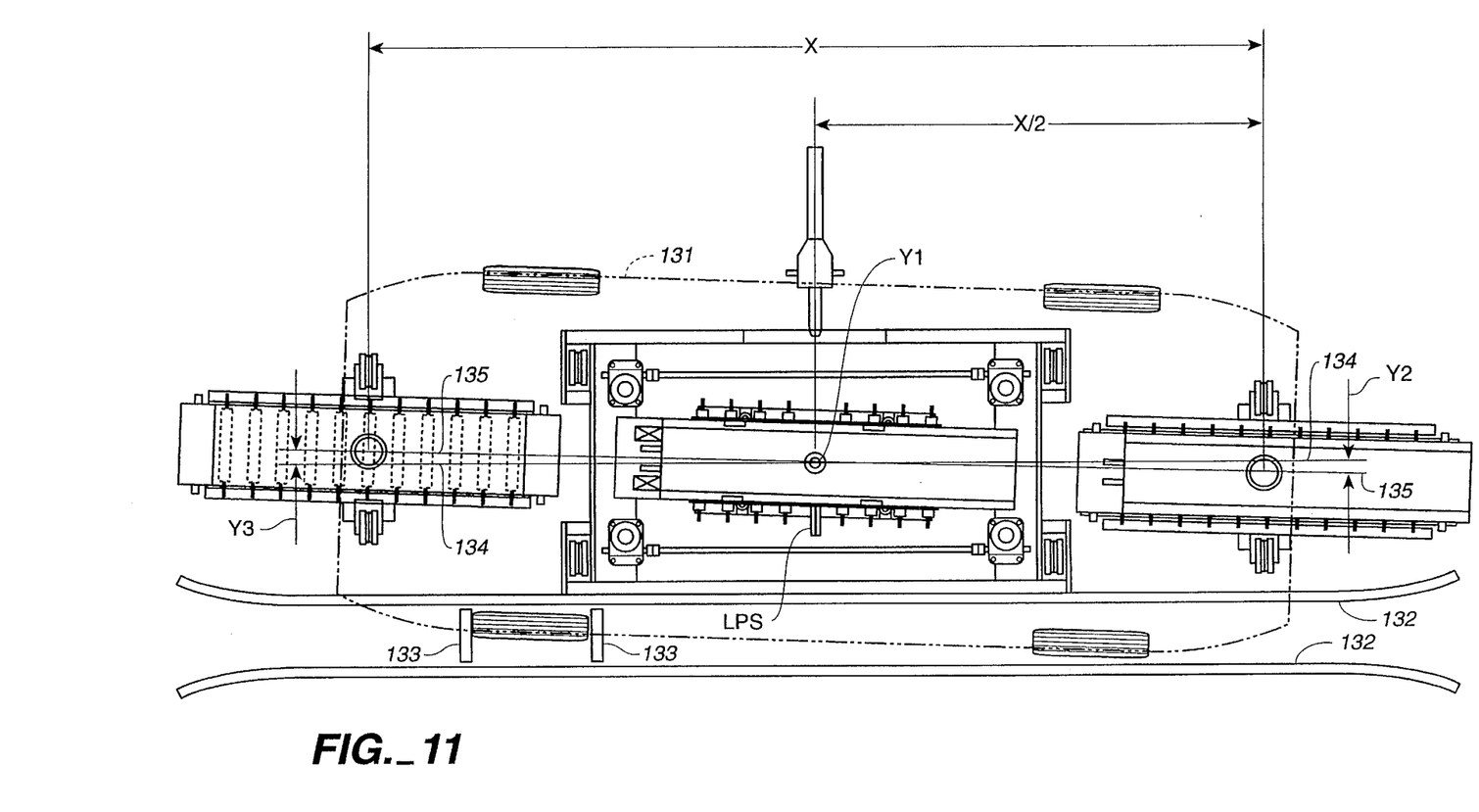
FIG. 11 is a plan view of a battery platform positioned on a lift at an exchange substation with two conveyance trolleys.

One embodiment of an alignment mechanism is described with reference to FIG. 11. A vehicle positioned slightly askew at substation 10 is shown in phantom outline at reference numeral 131. The two left tires are positioned within tire guides 132, which brings the vehicle into lateral position over lift 74, and the left front tire is positioned by wheel stoppers 133, which brings the vehicle into approximate fore and aft position over lift 74. Nevertheless the vehicle will generally be slightly misaligned with the lift underneath. In FIG. 11 axis 134 is the longitudinal axis (sometimes referred to as the "X" axis) lying along the direction of travel of an aligned vehicle at substation 10. Axis 135 is the centerline of the misaligned vehicle. There are two aspects of the alignment process. The first aspect is the positioning of lift 74 under the vehicle in position to receive the battery platform. This alignment is complicated by the fact that even with vehicle guide markers or wheel guides, vehicles will not always be positioned in precisely the same location and that, as noted above, battery platforms will generally be mounted in different locations on different model vehicles. Thus it is necessary to align lift 74 with the overlying battery platform, and this is an alignment that is vehicle dependent. That is, the alignment depends on the particular vehicle make and model even if the vehicle were positioned at the standard vehicle base position at the exchange substation. The second aspect of the alignment problem is the small angular misalignment of the battery platform with the rolling direction of the handoff conveyor, represented by the angular displacements Y2 and Y3 in FIG. 11, that will generally be exhibited even after lift 74 is aligned under the overlying platform.

In one alternative for positioning lift 74 under the vehicle, the lift is simply raised until it contacts the lowest point of the overlying vehicle. A visual inspection is made, e.g., by remote video camera 140, to confirm that the handoff conveyor is in position. Fine adjustments in the position may be made manually at control panel at exchange substation 10. To assist in manually positioning the conveyor, a sensor is provided to indicate when contact is made between the secondary lift assembly 102 and the battery platform. For this purpose contact strip sensors 142 run along the tops of the fore and aft contact rails 143 of secondary lift assembly 102. (See FIG. 10.) When sensors 142 determine that contact has been made with the bottom of the platform, a signal is displayed to the attendant on control panel.

An alternative method makes use of an auto-sensing mechanism for automatically positioning the lift and exchanging the battery platform with very little operator involvement. In this method the lift is moved into an initial, standard starting position, which is roughly the position appropriate for the widest vehicle that the service station exchange facility will service. The trailing edge of secondary lift assembly 102 is provided with a feeler-type contact sensor 144 projecting upward above the level of the lift itself. The vehicle is assumed to have been driven to a standard position at exchange substation 10 dictated by the vehicle positioning guides. The lift is raised until contact sensor 144 contacts the underside of the vehicle (at any point on the vehicle underside), at which point upward movement is automatically stopped. The lift is then moved forward while contact sensor 144 remains in contact with the vehicle. The battery platform extends downward from the base level of the vehicle underside. As the lift moves forward, sensor 144 detects the downward step at the edge of the battery platform. At this point the lift is approximately under the battery platform. A final adjustment is then made in the lift position to account for the offset of sensor 144 from positioning guides 119 so that the lift is brought to a stop when the cones 119 are positioned at the edges of the platform. The lift then engages the platform and is raised sufficiently to support the full weight of the platform. In so doing, it is necessary to make allowance for the suspension system adjustment inherent when the weight of the battery platform is shifted from the suspension system to the lift.

When the platform weight is fully supported by the lift, the platform is released from the vehicle. This may be accomplished manually or automatically. In the manual method the driver may be instructed to actuate a release lever or switch at the vehicle dashboard or otherwise accessible from the driver's seat, which rotates cradle arm 36 out of the way of the battery platform. Alternatively, secondary lift assembly 102 is provided with a mechanical "robot" arm 146 shown in FIG. 10 at the front face of the front contact rail 143. Arm 146 is equipped with an automatic tool, e.g., a pneumatic screwdriver or key 147 for releasing the platform. On command, arm 146 swings into position so that key 147 is received by a mating counterpart member such as drive socket 53a on the vehicle attached to cradle arm support beam 38. The drive socket 53a is coupled to cradle arm 36 so that rotation of the key 147 causes cradle arm 36 to swing out of the way of the battery platform. On the other side of the front contact rail 143 a second "robot" arm substantially the same as arm 146 is positioned. The second arm is received by a second drive socket 57a on the opposite side of the platform and operates in substantially the same manner as arm 146 to disengage the electrical input plug from the platform. As a safety measure, strip contact sensors 142 confirm that the platform is in position on rails 143 of lift 74 before the platform is released from vehicle. If the platform does not rest properly on the positioning guides, then a warning signal is provided. In response the lift may be automatically re-positioned according to the amount of the deficiency sensed by sensors 142, or the attendant may manually reposition the lift.

In a third and more sophisticated alternative, the make and model of the vehicle are automatically communicated to the exchange substation, which then automatically moves the lift and the vehicle until the two are in proper registration with one another. The exchange station apparatus is preprogrammed with the positions of the battery platforms and vehicle dimensions for the sensed vehicle make and model, and the lift and/or vehicle are automatically moved to bring them into alignment. In this alternative each vehicle is equipped with a data communication means 131 such as a light-emitting diode or infrared emitter, which may provide a coded data signal on command with the vehicle make and model or alternatively with the dimensions and location of the battery platform with respect to a standard, easily sensed, reference point on the vehicle. Methods for providing coded data signals are well known to those skilled in the art and need not be described in detail here. The data signal need not be a complex one and need not be encrypted. For example, a simple pulse code signal transmitting vehicle identification information and/or battery location codes in binary format will suffice. A receiving means 132 is provided at exchange substation 10 for receiving and reading the encoded data signal from the vehicle-based means 1 31 and providing this information to the station console, and the position of the lift is then automatically adjusted. Suitable transmitting and receiving means 131 and 132 are known from other contexts such as infrared-based remote control mechanisms commonly used for television and VCR control and thus need not be disclosed in detail here. In addition, in this alternative embodiment control of the vehicle movement may be given over to the exchange substation itself. For this purpose exchange substation is equipped with a vehicle movement assembly comprising powered wheel drive rollers of the type commonly employed to move vehicles at automated car wash stations. The powered drive rollers contact a wheel of the vehicle and urge the vehicle along a fixed track to the desired preprogrammed position. This and equivalent mechanisms for automatically moving the vehicle forward or back into position are well known and need not be described in detail here.

Platform alignment may alternatively be recorded by a fully mechanical mechanism. For this alternative a straight alignment bar located underneath the vehicle at exchange substation 10 is brought to rest against the battery platform after it is released to bring the bar into the same angular disposition as the released platform. The replacement platform may then be moved into alignment with the bar before it is inserted into the platform housing bay on the vehicle. More specifically, the alignment bar is a straight bar generally in line with the vehicle and effectively serves to extend the "vehicle line." The lift lowers the spent platform from the vehicle and pauses momentarily. The alignment bar is moved into position snugly against spent platform to mark the angular position. The bar is secured in that position. The new platform is brought down on trolley and snugs itself up against the alignment bar and thereby aligns itself in same position as the spent platform. A sensor may be provided for indicating when the bar has made contact. Routine mechanical arrangements may be employed for moving the bar into position and for locking the bar into its aligned position, and thus detailed mechanisms are not described here for this alternative embodiment.

Several different alignment mechanisms have been discussed here for purposes of illustration because an alignment mechanism is important to achieve certain benefits of the invention. The alignment mechanism enables the exchange to proceed more automatically and to proceed faster. It provides for smoother exchange and thus less wear on the battery platform and receiving bay on-board the vehicle. It also reduces the possibility of damage or injury through gnashing of misaligned components. Those skilled in the art will be able to devise other alignment mechanisms to accomplish the purposes of the present invention, which though they may be structurally quite different, will nevertheless achieve the benefits of the invention and thus be functionally equivalent to the mechanisms disclosed here. Thus, it is not intended that the alignment mechanism be limited only to the embodiments disclosed here.

Figure 12:
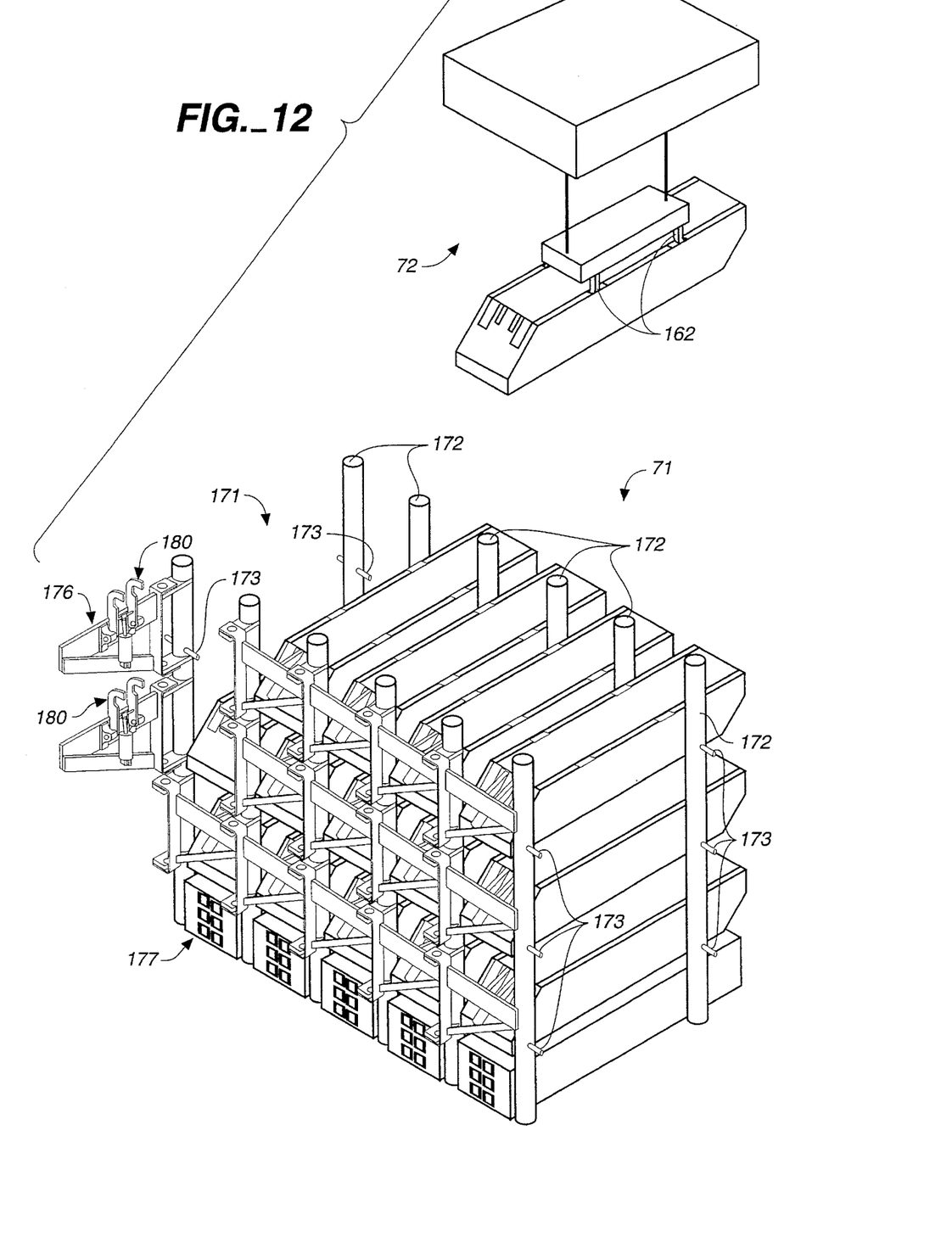
FIG. 12 is a perspective view of a platform manipulator and storage rack according to the invention.

The platform manipulator 72 is shown in FIG. 12 along with a battery platform storage rack 71. Manipulator 72 is used to move the platforms 12 to and from the conveyor system 73 and the platform racks 71. The platform manipulator 72 is positioned along an overhead track assembly of the type commonly used with fixed cranes to position the manipulator in a desired location. The path followed by a battery platform as it is lifted by manipulator 72 and moved along the track system is represented symbolically by arrows 1 61 in FIG. 1. Manipulator 72 is movable to pick up battery platforms 12 in certain areas of the staging substation 11 and deliver them to other areas. Manipulator 72 is provided with extending hooks 162 for grabbing a battery platform at hook openings 26. The manipulator grabs a battery platform from a storage rack and places it on a trolley waiting at the conveyor system entrance and retrieves the spent platforms and delivers them to the storage racks.

The platform storage rack 71 is designed to house and recharge the platforms 12. Rack 71 comprises a plurality of vertical cell blocks 171 containing structural support posts 172 and holder pins 173 for housing the platforms. Rack 71 also includes a recharge power arm assembly 176 for recharging the platforms, and block control box 177, which controls movement of the recharge power arm assembly and provides the recharging power. For simplicity of illustration, control and power lines between the control boxes 177 and their associated recharge power arms 176 have been omitted from FIG. 12. Rack 71 preferably holds a minimum of three vertically stacked platforms per cell block, one at each level, and the rack is structured such that manipulator 72 may pass between structural support posts 172 to grasp platforms 12 at all levels within the rack after the platforms at the upper levels have been removed. Support posts 172 are not attached across the platform cell blocks 171, but are held together in parallel to the platform cell blocks. Cell blocks 171 are provided with platform holder pins 173 attached to the posts within each cell that hold the platforms on the rack. A recharge power arm 176 is located at the front of each platform holding cell. The recharge power arm is mounted to rotate at one edge so that it may swing closed in front of its associated cell and contact the opposite post. Each recharge power arm is provided with a plug arm 180 of the same general form as plug arm 37 in cradle arm assembly 35 for making electrical connection with receptacle 181 on the battery platforms. When recharge power arm 176 swings shut, plug arm 180 rotates to engage receptacle 181 much in the same manner as plug arm 37 rotates to engage the receptacle when the battery platform is mounted on a vehicle. Here however the plug arm movement need not be intermediated through a mechanical linkage. Rotation of plug arm 181, as well as the rotational movement for opening and closing recharge power arm 176, are more conveniently controlled pneumatically. An air line connection for movement of plug arm 181 is seen at reference numeral 182. When electrical connection is made, the block control box supplies a charging current to the battery platform. Confirmation that plug arm 181 has engaged the corresponding receptacle in the battery platform may be made visually by an operator or may be sensed automatically through a sensor located in the battery platform that may, for example, send an acknowledgement signal to block control box 177 through plug arm 181.

The above descriptions and drawings disclose illustrative embodiments of the invention. Given the benefit of this disclosure, those skilled in the art will appreciate that various modifications, alternate constructions, and equivalents may also be employed to achieve the advantages of the invention. For example, although described here with respect to full scale electric vehicles intended for use on public streets and highways, including private vehicles and public transportation such as electric buses, a recharging service facility such as described here may also be used with model vehicles on a smaller scale. Moreover, although representative mechanisms have been described and illustrated for accomplishing the various operations to be performed at the service facility, these operations may be implemented in a variety of other ways achieving the same purpose and function of the illustrated mechanisms. Therefore, the invention is not to be limited to the above description and illustrations, but is defined by the appended claims.

What is claimed is:

1. An integrated battery exchange system for battery powered electric vehicles comprising:

an interchangeable battery platform structured to hold an assembly of batteries for powering the electric vehicle, said battery platform being formed to enclose said assembly of batteries and to be mounted in the electric vehicle, said platform further comprising:
an electrical power receptacle for electrically connecting said platform to the vehicle for powering the vehicle and to a power source for charging said assembly of batteries; and
connection means for use in grasping said platform for lifting and maneuvering thereof;

a battery-platform support structure defined in an electric vehicle for receiving and holding said battery platform, comprising:
means defining a housing bay at the underside of the electric vehicle structured and arranged to receive said battery platform;
retaining means for retaining said platform in said housing bay, said retaining means having an engaged position for securely retaining said platform in said housing bay under conditions of operation of the vehicle and a release position for removing said platform from said housing bay; and
electrical communication means for electrically connecting said vehicle to said battery platform, said electrical communication means having a contact configuration making an electrical connection with said platform for communicating power to the vehicle and a release configuration for removing said platform from said housing bay; and a service station including an exchange substation, at which a spent battery platform in a vehicle at said exchange station is exchanged with a charged battery platform, and a staging substation, at which battery platforms are prepared for exchange, said exchange substation comprising:
means defining a vehicle base position at said exchange station for placing said vehicle in position for battery platform exchange;
a lift comprising:
a primary lift assembly for raising and lowering said lift;
a secondary lift assembly mounted on said primary lift assembly for raising and lowering said lift by smaller amounts than said primary lift assembly; and
a platform receiving member mounted on said secondary lift assembly for receiving a battery platform;
wherein said lift is positionable underneath a vehicle in said base position; and
alignment means for determining the alignment of said spent battery platform as the spent platform is removed from the vehicle in registration with said housing bay and for aligning said charged battery platform corresponding to the spent platform alignment, whereby said charged battery platform is in registration with said housing bay as the charged battery platform is introduced into the housing bay; and said staging substation comprising:
a storage rack for housing a plurality of battery platforms;
a platform manipulator for automatically removing a battery platform from said storage rack and for transporting said battery platform therefrom; and
a platform conveyance means for conveying said battery platform from said staging substation to said exchange substation; and transfer means for transfering a battery platform from said platform conveyance means to said platform receiving member for installation into said housing bay.

2. The apparatus of claim 1 wherein said retaining means in said battery-platform support structure comprises:
a first retractable retaining assembly for receiving a first end of said platform, said first retaining assembly having a first position for retaining said platform securely in said vehicle and a second position for releasing said platform from said vehicle; and
a second retaining assembly for receiving the opposing end of said platform for retaining said platform in said vehicle.

3. The apparatus of claim 1 wherein
said platform receiving member in said lift comprises:
positioning guides for receiving a spent battery platform from said vehicle housing bay; and
said lift includes a thrust bearing,
wherein said platform receiving member and said secondary lift assembly are mounted on said thrust bearing to rotate as a unit about a vertical axis under the action of said positioning guides when a spent platform is brought to rest thereon.

4. The apparatus of claim 3 wherein said platform receiving member in said lift comprises:
a powered conveyor rack including a handoff conveyor segment for transfer of a battery platform between said lift and said platform conveyance means.

* * * * *